(12) United States Patent
Dekel et al.

(10) Patent No.: US 8,050,503 B2
(45) Date of Patent: Nov. 1, 2011

(54) SYSTEMS AND METHODS FOR COMPUTER VISION USING CURVELETS

(75) Inventors: Shai Dekel, Ramat-Hasharon (IL); Alexander Sherman, Modiin (IL)

(73) Assignee: General Electric Company, Schenectady, NY (US)

( * ) Notice: Subject to any disclaimer, the term of this patent is extended or adjusted under 35 U.S.C. 154(b) by 1152 days.

(21) Appl. No.: 11/773,820

(22) Filed: Jul. 5, 2007

(65) Prior Publication Data

US 2009/0010558 A1    Jan. 8, 2009

(51) Int. Cl.
*G06K 9/00* (2006.01)
(52) U.S. Cl. ...................................... 382/209
(58) Field of Classification Search .................. 382/108, 382/111, 165, 206, 209, 217; 345/582, 686, 345/2.2; 348/128; 707/708, 729
See application file for complete search history.

(56) References Cited

U.S. PATENT DOCUMENTS

| | | | |
|---|---|---|---|
| 6,345,274 B1 | 2/2002 | Zhu et al. | |
| 6,744,935 B2 | 6/2004 | Choi et al. | |
| 6,754,667 B2 | 6/2004 | Kim et al. | |
| 6,760,714 B1 | 7/2004 | Caid et al. | |
| 6,834,288 B2 | 12/2004 | Chen et al. | |
| 6,879,394 B2 * | 4/2005 | Amblard et al. | 356/301 |
| 7,227,893 B1 * | 6/2007 | Srinivasa et al. | 375/240.08 |
| 7,751,621 B1 * | 7/2010 | Jacobsen | 382/173 |
| 7,805,183 B2 * | 9/2010 | Keely et al. | 600/476 |
| 2005/0286795 A1 * | 12/2005 | Zhang | 382/268 |
| 2006/0029279 A1 * | 2/2006 | Donoho | 382/232 |
| 2006/0147099 A1 | 7/2006 | Marshall et al. | |
| 2007/0038691 A1 * | 2/2007 | Candes et al. | 708/400 |

OTHER PUBLICATIONS

Irfan et al. (Automated Content based Image Retrieval using Wavelets), Transactions on engineering, computing and technology VI, Dec. 2004.*
Wiley et al. (Using Quadratic Simplicial Elements for Hierarchical Approximation and Visualization), CIPIC, Feb. 2002.*
Semler et al. (Curvelet-based Texture classification of Tissues in Computed Tomography), IEEE, 2006.*
Dong et al. (Digital Curvelet Transform for Palmprint Recognition), Department of Automatic Control, Nationl University of Defense Technology, China, 2004.*
Lei et al. (Image Curvelet Feature Extraction and Matching), Proc. ICIP, Oct. 1997.*
Dong et al. ("Digital Curvelet Transform for Palmprint Recognition", Sinobiometrics 2004, LNC 3338, p. 639-645, 2004).*

(Continued)

*Primary Examiner* — Jason M Repko
*Assistant Examiner* — Shervin Nakhjavan
(74) *Attorney, Agent, or Firm* — McAndrews, Held & Malloy, Ltd.; Armando Pastrana, Jr.

(57) ABSTRACT

Certain embodiments of the present invention provide a system for computer vision including a plurality of images, a signature processor adapted to generate a signature based at least in part on a curvelet transform, and a matching processor adapted to receive a query image. The matching processor is adapted to determine a query signature for the query image using the signature processor. The matching processor is adapted to determine at least one matching image from the plurality of images based at least in part on the query signature.

35 Claims, 16 Drawing Sheets

OTHER PUBLICATIONS

B. Schiele and L. Crowley, Recognition without correspondence using multidimensional receptive field histograms, Comp. Vision 36 (2000), 31-50.

E. Simoncelli and W. Freeman, The steerable pyramid: A flexible architecture for multi-scale derivative computation, in Proc. IEEE ICIP, Washington, DC, 1995.

K. Tieu and P. Viola, Boosting image retrieval, Comp. Vision 56 (2004), 17-36.

G. Tzagkarakis, B. Beferull-Lozano and P. Tsakalides, Rotation-invariant texture retrieval with gaussianized steerable pyramids, IEEE Trans. Image Processing 15 (2006), 2702-2718.

USC-SIPI Image database (http://sipi.usc.edu/database/).

Z. Zhuang and M. Ouhyoung, Novel multiresolution metrics for content-based image retrieval, Proc. Fifth Pacific Conf. Computer Graphics and Applications 1997, 105-114.

C. Brambilla, A. Ventura, I. Gagliardi and R. Schettini: Multiresolution Wavelet Transform and Supervised Learning for Content-Based Image Retrieval, Proceedings of International Conference on Multimedia Communications Systems, vol. 1 (1999), 183-188.

E. J. Candès and D. L. Donoho, Continuous Curvelet Transform: I. Resolution of the Wavefront Set, Appl. Comput. Harmon. Anal. 19 (2005), 162-197.

E. J. Candès and D. L. Donoho, Continuous Curvelet Transform: II Discretization and Frames, Appl. Comput. Harmon. Anal. 19 (2005), 198-222.

E. Candès, L. Demanet, D. Donoho and L. Ying, Fast Discrete Curvelet Transforms, SIAM Multiscale Model. Simul. 5-3 (2006), 861-899.

M. Do, S. Ayer and M. Vetterli, Invariant image retrieval using the wavelet maxima moment, Proceedings of 3rd Int. Conf. on visual info. and info. systems, 1999.

P. Irfan, Sumari and K. Hailiza, Automated Content based Image Retrieval using Wavelets, Trans. Eng. Comp and Tech, Dec. 2004, 1305-5313.

C. Jacobs, A. Finkelstein and D. Salesin, Fast Multiresolution Image Querying, Proceedings of the 22nd annual conference on Computer graphics and interactive techniques 1995, 277-286.

M. Kobayakwa, M. Hoshi, T. Ohmori, Robust texture image retrieval using hierarchical correlations of wavelet coefficients, Proc. 15th International Conference on Pattern Recognition, vol. 3 (2000).

D. Po and M. Do, Directional multiscale modeling of images using the contourlet transform, IEEE Transactions on Image Processing 15 (2006), 1610-1620.

P. Burt and E. Adelson, The Laplacian pyramid as a compact image code, IEEE Trans. Communication 31 (1983), 532-540.

E. Candès and D. Donoho, New tight frames of Curvelets and optimal representations of objects with piecewise singularities, Comm. Pure App. Math. 57 (2003), 219-266.

Curvelets web-site (http://www.curvelets.org).

S. Dekel, D. Leviatan and M. Sharir, On bivariate smoothness spaces associated with nonlinear approximation, Constr. Approx. 20 (2004), 625-646.

M. Do and M. Vetterli, Rotation invariant texture characterization and retrieval using steerable wavelet-domain hidden Markov models, IEEE Trans. Multimedia 4 (2002), 517-527.

D.L. Donoho and A.G. Flesia, Can recent innovations in harmonic analysis 'explain' key findings in natural image statistics?, Network: Computation in Neural Systems 12 (2001), 371-393.

D. Field, Wavelets, vision and the statistics of natural scenes, Phil. Trans. R. Soc. Lond. A 357 (1999), 2527-2542.

W. Freeman and E. Adelson, The design and use of steerable filters, IEEE Trans. Patt. Anal. and Machine Intell. 13 (1991), 891-906.

H. Greenspan, S. Belongie, R. Goodman and P. Perona, Rotation invariant texture recognition using a steerable pyramid, ICPR 1994, Jerusalem, Israel, 162-167.

K. Guo, G. Kutyniok, and D. Labate, Sparse Multidimensional Representations using Anisotropic Dilation and Shear Operators, Wavelets and Splines (Athens, GA, 2005), Nashboro Press, Nashville, TN (2006), 189-201.

M. Hu, Visual pattern recognition by moment invariance, IRE Trans. Info. Theory 8 (1962), 179-187.

T. Kadir and M. Brady, Saliency, Scale and Image Description, Comp. Vision 45 (2001), 83-105.

N. Kingsbury, Complex wavelets for shift invariant analysis and filtering of signals, Appl. Comput. Harmon. Anal. 10 (2001), 234-253.

D. G. Lowe, Object Recognition from Local Scale-Invariant Features, Proc. IEEE Comp. Vision 2 (1999), 1150-1157.

B. Olshausen and D. Field, Neural Comput. 8 (2005), 1665-99.

S. Mallat, Wavelets for a vision, Proc. IEEE 84 (1998), 604-614.

S. Mallat and S. Zhong, Characterization of signals from multiscale edges, IEEE Trans. Pattern Anal. Machine Intelligence 14 (1992), 710-732.

K. Mikolajczyk, A. Zisserman and C. Schmid, Shape recognition with edge-based features, Proceedings of the British Machine Vision Conference (2003).

B. Schiele and L. Crowley, Recognition without correspondence using multidimensional receptive field histograms, Comp. Vision 36 (2000), 31-50.

E. Simoncelli and W. Freeman, The steerable pyramid: A flexible architecture for multi-scale derivative computation, in Proc. IEEE ICIP, Washington, DC, 1995.

K. Tieu and P. Viola, Boosting image retrieval, Comp. Vision 56 (2004), 17-36.

G. Tzagkarakis, B. Beferull-Lozano and P. Tsakalides, Rotation-invariant texture retrieval with gaussianized steerable pyramids, IEEE Trans. Image Processing 15 (2006), 2702-2718.

Z. Zhuang and M. Ouhyoung, Novel multiresolution metrics for content-based image retrieval, Proc. Fifth Pacific Conf. Computer Graphics and Applications 1997, 105-114.

* cited by examiner

FIG. 5A
FIG. 5B
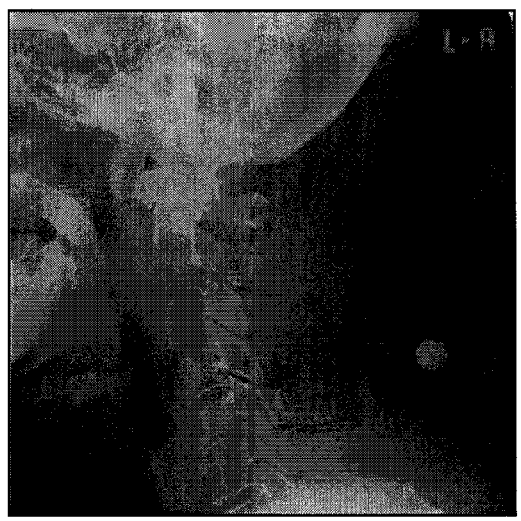

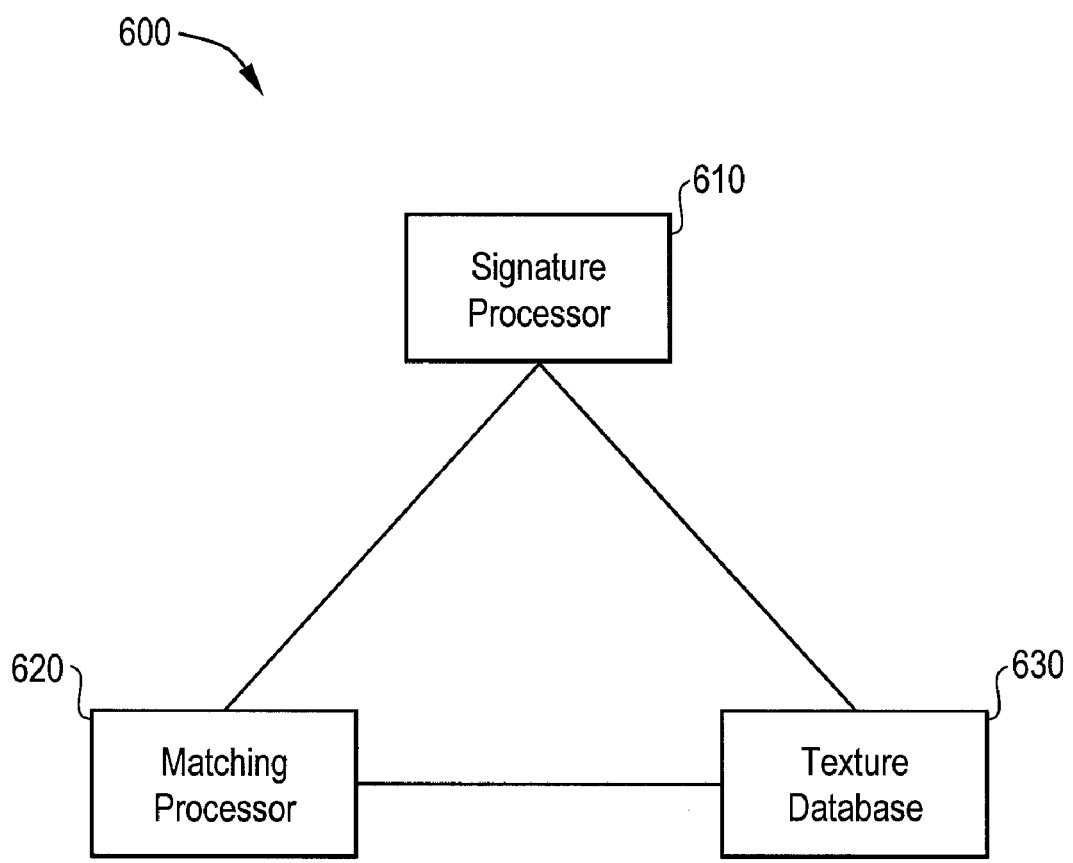

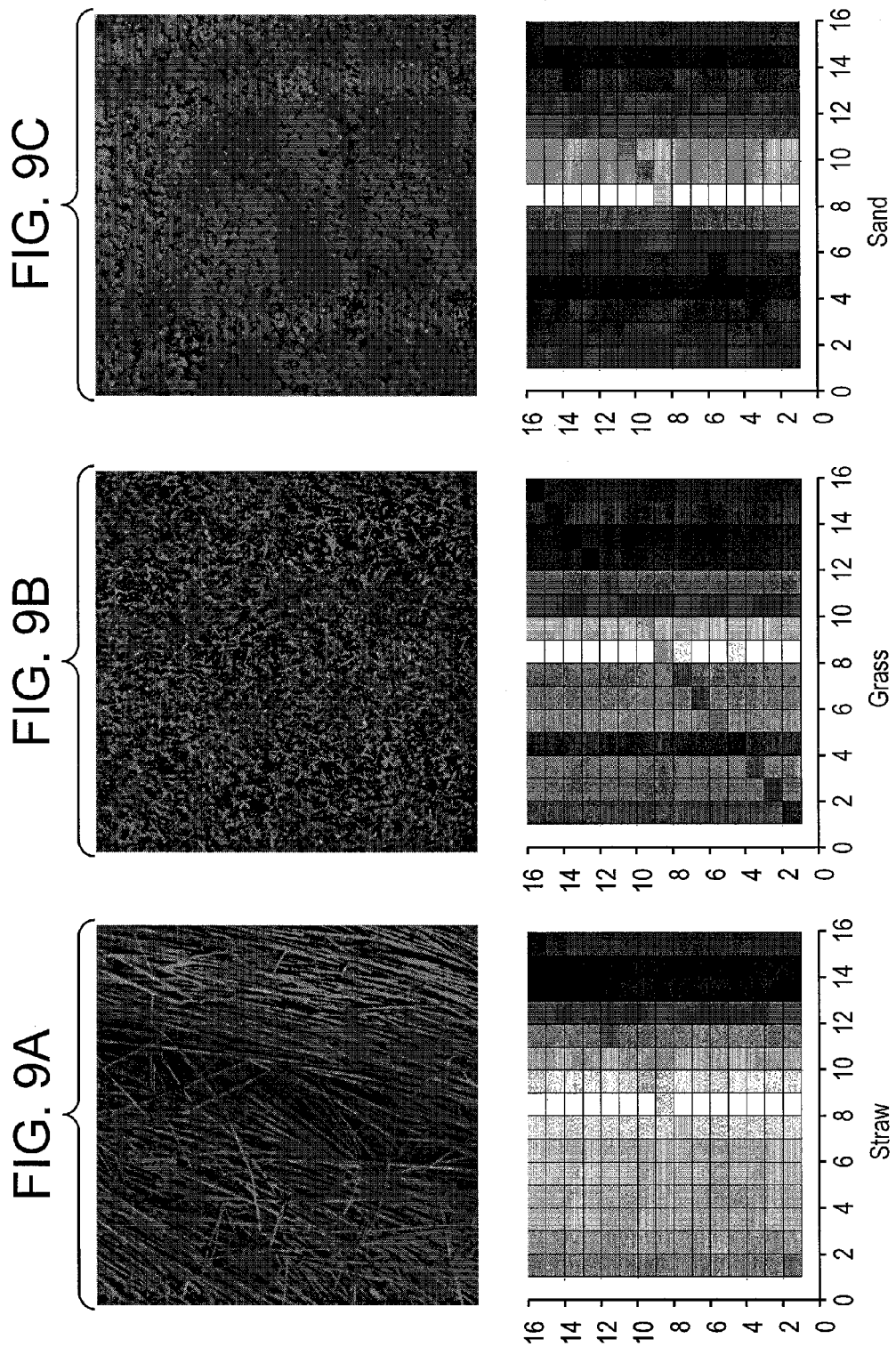

FIG. 10A
FIG. 10B
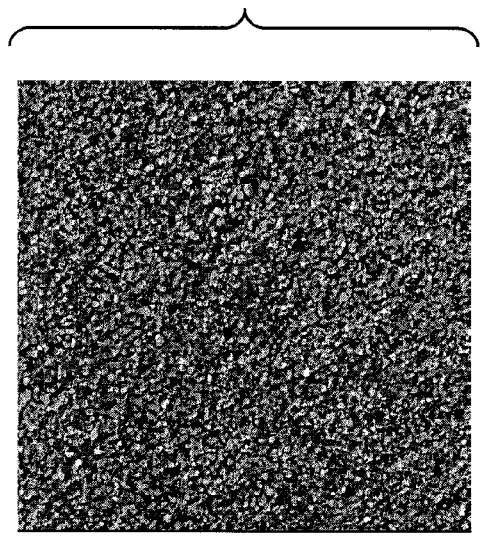
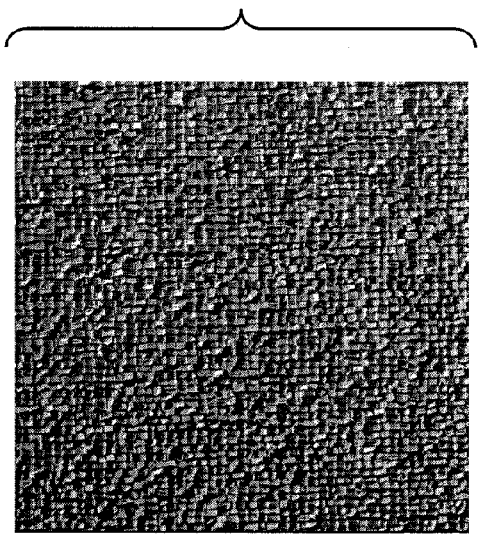
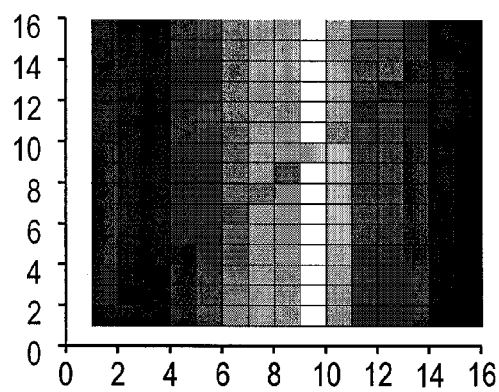
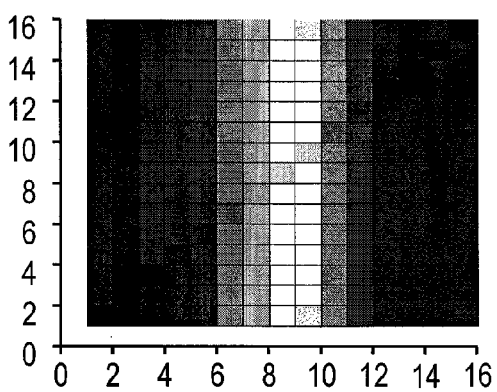

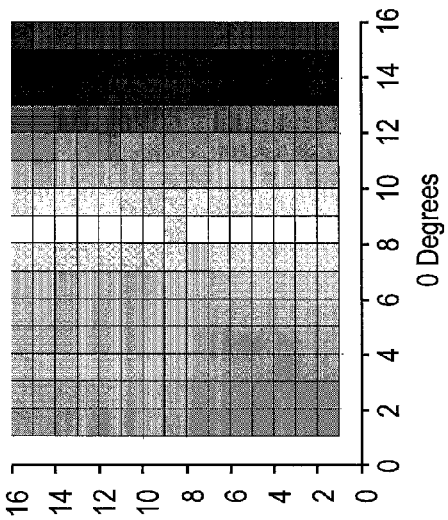
FIG. 11B
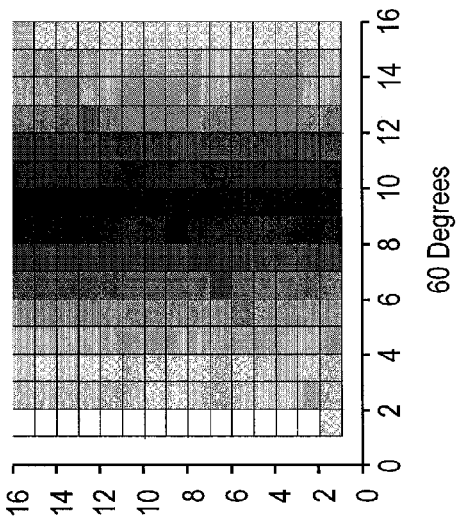
FIG. 11D
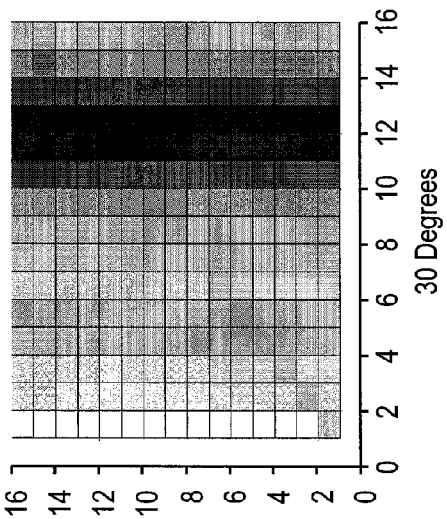
FIG. 11A
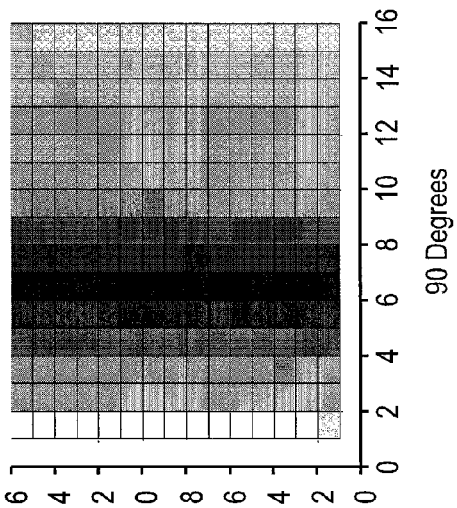
FIG. 11C

SYSTEMS AND METHODS FOR COMPUTER VISION USING CURVELETS

BACKGROUND OF THE INVENTION

The present invention generally relates to image processing. More specifically, the present invention relates to systems and methods for computer vision using curvelets.

Curvelets are a recent construction of a transform with excellent time-frequency-orientation localization. Curvelets are a tight frame of $L_2(\mathbb{R})$. Each function $f \epsilon L_2(\mathbb{R}^2)$ has the representation:

$$f = \Sigma \langle f, \phi_{j,l,k} \rangle \phi_{j,l,k}$$

where $j \geq 0$ is the scale index, $l \epsilon [0, 2\pi]$ is the orientation index and $k \epsilon \mathbb{Z}^2$ is the location. In addition, the Parseval equality holds:

$$\|f\|_2^2 = \sum_{j,l,k} |\langle f, \varphi_{j,l,k} \rangle|^2$$

Curvelet functions at the scale j=0 are of a different nature, exactly as in the Fourier and wavelets transforms, and their role is to capture a low-resolution approximation of the function. From the scale j=1 through to higher scales, the essential support of the curvelet functions becomes longer and thinner.

An exemplary implementation of a curvelet transform is discussed in United States Patent Application Publication Number 2007/0038691, entitled "Methods for Performing Fast Discrete Curvelet Transforms of Data."

BRIEF SUMMARY OF THE INVENTION

Certain embodiments of the present invention provide a system for computer vision including a plurality of images, a signature processor adapted to generate a signature based at least in part on a curvelet transform, and a matching processor adapted to receive a query image. The matching processor is adapted to determine a query signature for the query image using the signature processor. The matching processor is adapted to determine at least one matching image from the plurality of images based at least in part on the query signature.

Certain embodiments of the present invention provide a method for computer vision including receiving a query image, generating a query signature for the query image based at least in part on a curvelet transform, and matching at least one image from a plurality of images based at least in part on the query signature.

Certain embodiments of the present invention provide a system for content based image retrieval including a signature processor adapted to generate a signature based at least in part on a curvelet transform, a database including a plurality of database images, and a matching processor adapted to determine a query signature for a query image using the signature processor. Each database image is associated with a database image signature generated by the signature processor. The matching processor is adapted to determine at least one matching image from the plurality of database images based at least in part on the query signature and the associated database image signatures.

Certain embodiments of the present invention provide a system for texture analysis and retrieval including a signature processor adapted to generate a signature based at least in part on a curvelet transform, a texture database including a plurality of database textures, and a matching processor adapted to determine a query signature for a query texture using the signature processor. Each database texture is associated with a database texture signature generated by the signature processor. The matching processor is adapted to determine at least one matching texture from the plurality of database texture based at least in part on the query signature and the associated database texture signatures.

Certain embodiments of the present invention provide a system for object recognition including a signature processor adapted to determine a local feature for an object image, a database including a plurality of input images, and a matching processor. The local feature includes a local group of curvelet coefficients. The matching processor is adapted to determine at least one matching image from the plurality of input images based at least in part on the local feature.

BRIEF DESCRIPTION OF SEVERAL VIEWS OF THE DRAWINGS

FIGS. 5A-5B illustrate matching images as determined according to an embodiment of the present invention.

FIG. 6 illustrates a system for texture analysis and retrieval according to an embodiment of the present invention.

FIGS. 9A-C illustrate examples of texture test images and their corresponding directional interaction matrices.

FIGS. 10A-B illustrate examples of textures and their corresponding directional matrices.

FIGS. 11A-D illustrate matrices for rotated versions of a sample texture image.

Figure 1:
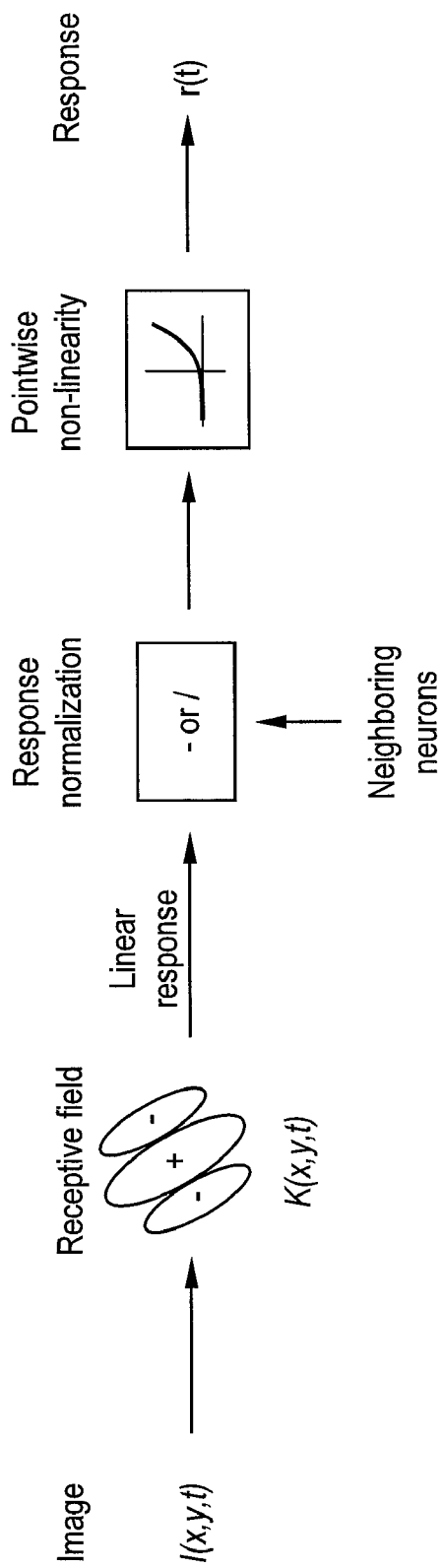
FIG. 1 illustrates a low-level vision model.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Certain features of curvelets have been identified that play an important role in applications utilizing sparse representations of visual data. Curvelets are well-localized in frequency and orientation since they are supported on specific wedges of the frequency domain. In addition, curvelets are well-localized in the time domain. At the scale $j \geq 1$, they are essentially supported on ellipses of length $2^{-j/2}$ and width $2^{-j}$ and have rapid decay. Also, because curvelets are constructed by tiling the frequency plane, they are $C^\infty$ complex functions.

Curvelet have infinite number of moments and also "directional" moments. That is, $$\int_{-\infty}^{\infty} \varphi_j(x_1, x_2) x_1^k dx_1 = 0, \; k \geq 0, \; \forall x_2$$

holds with $\phi_j$ the "generating" curvelet for the scale $j \geq 1$, whereas all curvelets at this scale correspond to rotations and shifts of $\phi_j$, as described E. Candes, L. Demanet, D. Donoho, and L. Ying, Fast Discrete Curvelet Transforms, Multiscale Modeling & Simulation 5, 861-899 (2006). These properties imply that if a curvelet is essentially supported on a smooth part of the image, then the coefficient's modulus is relatively small. When a curvelet is aligned with an edge of the image, then the modulus of its coefficient will be significant. In the case the curvelet is essentially intersecting an edge, but not aligned with the edge, then the size of the coefficient depends on the local angle between the direction of the curvelet function and the edge as described in E. Candes and D. Donoho, Continuous Curvelet Transform: I. Resolution of the Wavefront Set, Applied and Computational Harmonic Analysis 19, 162-197 (2005).

The curvelet transform essentially decomposes the image into a low-resolution of the image and a multi-scale directional representation of the higher scales. Each curvelet basis function is associated with a scale, direction, and spatial location.

Assume we wish to approximate $f(x) = 1_\Omega(x)$, the indicator function of a smooth compact domain $\Omega \subset [0,1]^2$. In this special case, one can approximate the boundary $\partial\Omega$ using a polygon with segments of length $1/N$ and accuracy $O(1/N^2)$. Based on the boundary curve approximation, one can construct a triangulation $$[0,1]^2 = \bigcup_{n=1}^{CN} \Delta_n$$

and an approximation:

$$S_N(x) = \sum_{n=1}^{CN} c_n 1_{\Delta_n}(x), \; c_n := \begin{cases} 1 & \Delta_n \cap \Omega \neq \emptyset, \\ 0 & \text{else,} \end{cases} \quad \text{(Equation 1)}$$

that satisfies $$\|f - S_N\|_2 \leq C(\Omega)\frac{1}{N}$$

Now, let $f_N$ be the non-linear (greedy) approximant:

$$f_N(x) := \sum_{n=1}^{N} \langle f, \varphi_{j,l,k}^{(n)} \rangle \varphi_{j,l,k}^{(n)}, \quad \text{(Equation 2)}$$

where $$|\langle f, \varphi_{j,l,k}^{(1)} \rangle| \geq |\langle f, \varphi_{j,l,k}^{(2)} \rangle| \geq \ldots$$

Then, $$\|f - f_N\|_2 \leq C(\Omega)\frac{(\log(N))^{3/2}}{N}$$

as shown in E. Candes and D. Donoho, New Tight Frames of Curvelets and Optimal Representations of Objects with Piecewise $C^2$ Singularities, Communications of Pure and Applied Mathematics 57, 219-266 (2003). Therefore, the performance of non-linear curvelet approximation in Equation 2 is near-optimal, since it is, up to a logarithmic factor, equivalent to the estimate in Equation 1 of the curve based method.

The Fast Discrete Curvelet Transform (FDCT) is applied using a Cartesian grid of the time and frequency domains to better suit the rectangular geometry of input images. The MatLab code for the FDCT is published online at the curvelets web site http://www.curvelets.org. For each input digital image I we compute a representation using the FDCT as follows:

$$\{I(x_1, x_2)\} \underset{FDCT}{\Longrightarrow} I_{low} + \{c_{j,l,k} = \langle I, \varphi_{j,l,k} \rangle\}_{j \geq 1} \quad \text{(Equation 3)}$$

The algorithm's complexity is $O(n^2 \log n)$ for an image of dimension n×n.

The curvelet representation is actually an over-sampling of the image. That is, there are more coefficients than image pixels by a factor of roughly 2.8. However, certain embodiments include the heuristic that only a very small portion of the curvelet coefficients are significant and are needed to create a robust signature for the purpose of the presently described algorithms.

In certain embodiments, the highest scale curvelet coefficients are not used. This avoids a stability issue resulting from sampling thin wedges in the frequency domain and speeds up the computations.

In certain embodiments, only the moduli of the coefficients $\{c_{j,l,k}\}$ are used. The modulus corresponds to local responses to visual activity at a certain scale, orientation, and location of the image. This implies that, at each scale, we only require the curvelet coefficients corresponding to the first half of the orientations since, by construction, the modulus of the curvelets coefficients at the same location with orientation difference of $\pi$ is identical.

In certain embodiments, the inverse curvelet transform is not utilized. Once the visual data is transformed to the curvelet domain, the analysis is done using the modulus of the coefficients. We note that the inverse transform is more computationally intensive than the forward transform.

As described above, in certain embodiments, only partial curvelet information is utilized and therefore a partial curvelet transform may be used. That is, a faster curvelet computational scheme may be utilized by computing only the partial curvelet data because only partial information may be needed for computer vision analysis/detection purposes. For example, certain scales, such as the highest scales, may not be computed. As another example, only half the orientations may be computed. As another example, only the modulus of coefficients may be computed.

Certain embodiments can support images in one or more of a variety of color spaces. For example, grayscale, RGB, and/or CMYK color spaces may be supported. The curvelet transform may be applied to each color channel separately, for example. As another example, the curvelet transform may be applied to new channels computed from the original channels. The curvelet transform may be applied to a grayscale image may be created from an RGB image, for example.

In certain embodiments, the curvelet transform may be applied to a sequence of images. This is supported by applying a 3D curvelet transform to the sequence, where the location parameter k is three-dimensional.

Thus, the following description is explained with respect to two-dimensional, grayscale images. However, it should be clear that color spaces and image sequences are also supported.

Certain embodiments of the present invention may serve as a computational framework for low-level computer vision. FIG. 1 illustrates a low-level vision model. The low-level vision model in FIG. 1 is described in B. Olshausen and D. Field, How Close are We to Understanding VI?, Neural Computation 17, 1667-99 (2005). Curvelets may be used in the role of the receptive field illustrated in FIG. 1. Certain embodiments of the present invention, as discussed in more detail below, may solve computer vision problems by applying a non-linear computational process based on curvelet coefficients and containing elements of the "Response normalization" and the "Pointwise non-linearity" blocks illustrated in FIG. 1.

Another property of curvelets to note is their "sampling rate." Curvelets are almost "critically" sampled. Roughly speaking, this means there are just "enough" scales, rotations, and locations so as to allow the curvelet transform to represent functions (i.e., to be invertible). In computer vision applications, it may be advantageous to allow a more redundant representation. For example, in order to identify more precisely locations of significant features, it might be useful to have more orientations at a given scale or "sample" a given scale and orientation at more centers. Control over scales and orientations can be done by changing the tiling of the frequency planes. However, adding more locations might imply that this over-redundant curvelet system will become a frame instead of a tight frame and that a second dual curvelet system needs to be employed for the purposes of computing function representations.

One exemplary application of curvelets to computer vision is content-based image retrieval (CBIR). Another exemplary application of curvelets to computer vision is texture analysis and retrieval. Another exemplary application of curvelets to computer vision is object recognition. Various embodiments of the present invention are discussed below relating to these applications. However, it should be understood that the present invention may be applied to other computer vision applications.

Figure 2:
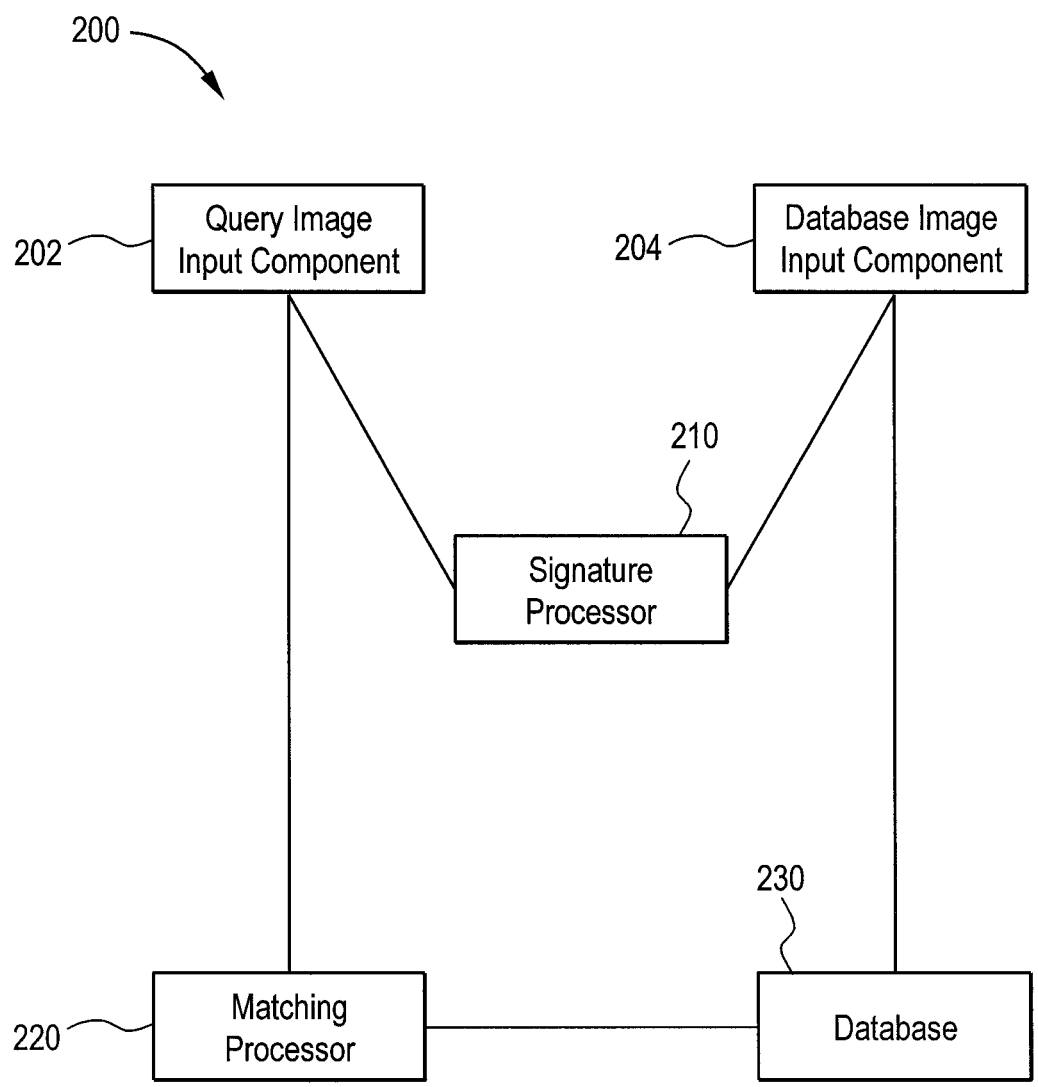
FIG. 2 illustrates a system for content-based image retrieval according to an embodiment of the present invention.

FIG. 2 illustrates a system 200 for content-based image retrieval according to an embodiment of the present invention. The system 200 includes a query image input component 202, a database image input component 204, signature processor 210, a matching processor 220, and a database 230.

The query image input component 202 is in communication with the signature processor 210 and the matching processor 220. The database image input component 204 is in communication with the signature processor 210 and the database 230. The matching processor 220 is also in communication with the database 230.

In operation, a query image is received by the query image input component 202. A query signature is determined by the signature processor 210 for the query image. The matching processor 220 determines one or more matching images in the database 230. The matching images are determined based at least in part on the query signature and signatures associated with the images in the database 230.

The query image input component 202 may receive a query image such as a medical image. The medical image may be acquired by an imaging modality such as Computed Tomography (CT), Magnetic Resonance Imaging (MRI), Ultrasound (US), Positron Emission Tomography (PET), and Computed Radiography (CR), for example. For example, a physician diagnosing a patient and observing the result of an imaging exam may want to view visually similar images that have already been diagnosed. For example, the desired images may have been from other cases the physician has treated.

Figure 3:
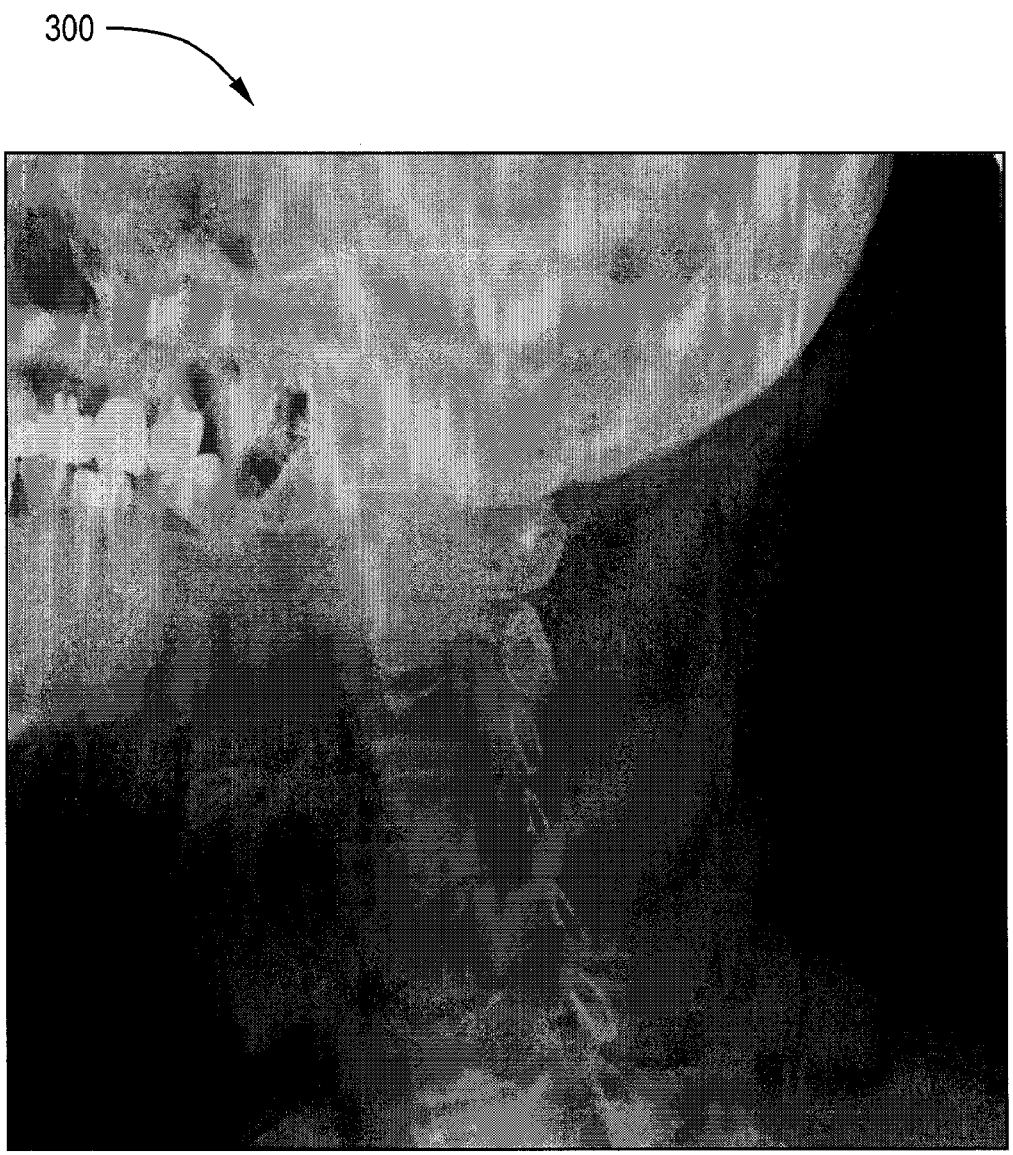
FIG. 3 illustrates an exemplary query image used in accordance with an embodiment of the present invention.
Figure 4C:
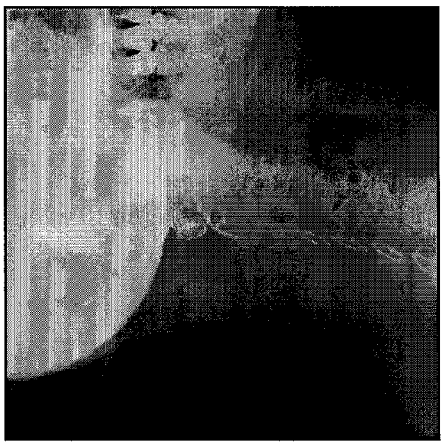
FIGS. 4A-4E illustrate exemplary images in the database according to an embodiment of the present invention.
Figure 4E:
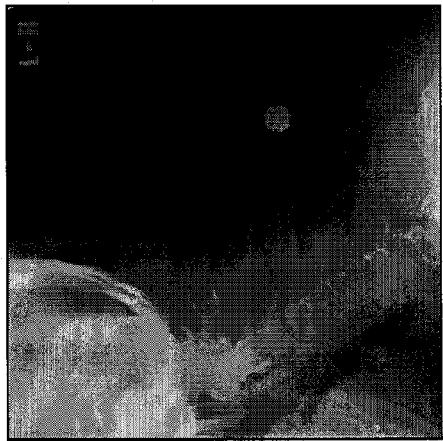
Figure 4B:
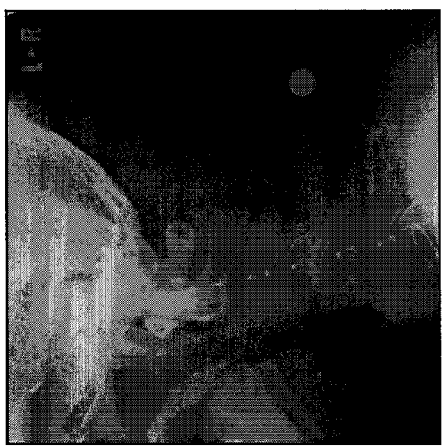
Figure 4D:
Figure 4A:
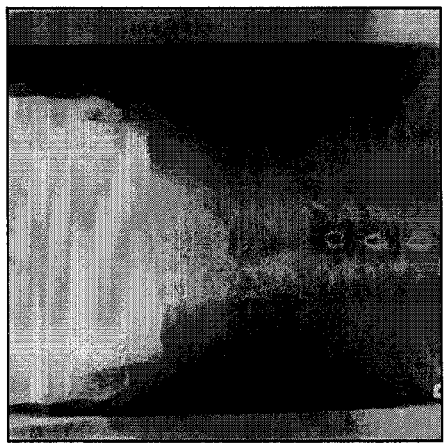

FIG. 3 illustrates an exemplary query image 300 used in accordance with an embodiment of the present invention. The query image 300 shown in FIG. 3 is a CR image of a patient's neck.

The signature processor 210 is adapted to determine a signature for an image. For example, the query image input component 202 may utilize the signature processor 210 to determine a query signature for the query image 300.

The signature processor 210 determines a signature for an image based at least in part on a curvelet transforms The query signature may be a vector of real numbers whose length is smaller than the number of pixels in the image. Typically, the length of the query signature is substantially smaller than the number of pixels in the image.

In certain embodiments, the query signature is invariant in one or more of shift, rotation, and scaling of the main visual features in the query image. In certain embodiments, the query signature is "similar" to the signature of another image that is a deformation of the query image.

To better capture structural invariance under shift, rotation, and scale, certain embodiments of the present invention utilize Hu's invariants. Using Hu's invariants is a method that is known to work well in the simpler framework of segmentation-based CBIR methods and also for wavelet maxima-based CBIR. However, it was not applied previously on coefficients of discrete transforms. The reason we can apply the method in our framework is because the curvelet representation is sparser than previous discrete transforms such as wavelets. It better captures the strong edges in images since the curvelet coefficients are significant only if the corresponding curvelets are locally aligned with these edges.

Assume for simplicity that $g:[0,1]^2 \to \mathbb{R}$ is very "sparse" in the sense that it attains large values only on a very small subset and is also compactly supported in some domain $\Omega \subset [0,1]^2$. We compute normalized moment:

$$\bar{x}_1 := \frac{\int_{\mathbb{R}^2} x_1 g(x_1, x_2) dx}{\int_{\mathbb{R}^2} g(x_1, x_2) dx}, \bar{x}_2 := \frac{\int_{\mathbb{R}^2} x_2 g(x_1, x_2) dx}{\int_{\mathbb{R}^2} g(x_1, x_2) dx}$$

$$\mu_{p,q} := \int_{\mathbb{R}^2} (x_1 - \bar{x}_1)^p (x_2 - \bar{x}_2)^p g(x_1, x_2) dx$$

Hu's invariants remain unchanged under shift, rotation, and scale of g (x). The definitions of the first three are:

$\mu_{2,0} + \mu_{0,2}$ $(\mu_{2,0} - \mu_{0,2})^2 + 4\mu_{1,1}^2$ $(\mu_{3,0} - \mu_{1,2})^2 + (\mu_{2,1} - \mu_{0,3})^2$

To apply Hu's invariants in the curvelet framework we compute multi-resolution edge maps from the curvelet transform as follows. We fix a lowest scale $j_1 > 1$ and a highest scale $1 \leq j_1 \leq j_2$ and for each $j_1 \leq j \leq j_2$ we set:

$$g_j(x_1, x_2) := \frac{\tilde{g}_j(x_1, x_2)}{\max \tilde{g}_j}, \quad \text{(Equation 4)}$$

$$\tilde{g}_j(x_1, x_2) := \max_{v_{j,l,k} = (x_1, x_2)} |c_{j,l,k}|,$$

$v_{j,l,k}$ center of $\varphi_{j,l,k}$ where it is understood that $\tilde{g}_j(x_1, x_2) = 0$ at points $(x_1, x_2)$ that are not centers of any curvelets. Note that $g_j(x_1, x_2)$ is indeed a well-defined function. For example, if $(x_1, x_2)$ is a breakpoint in an image edge where several curvelets have their centers, the maximum in Equation 4 will be attained at one of the orientations aligned with a smooth curve segment ending at the corner. The normalization in Equation 4 is needed, since we want to compare different scales and images with different brightness levels.

Figure 16:
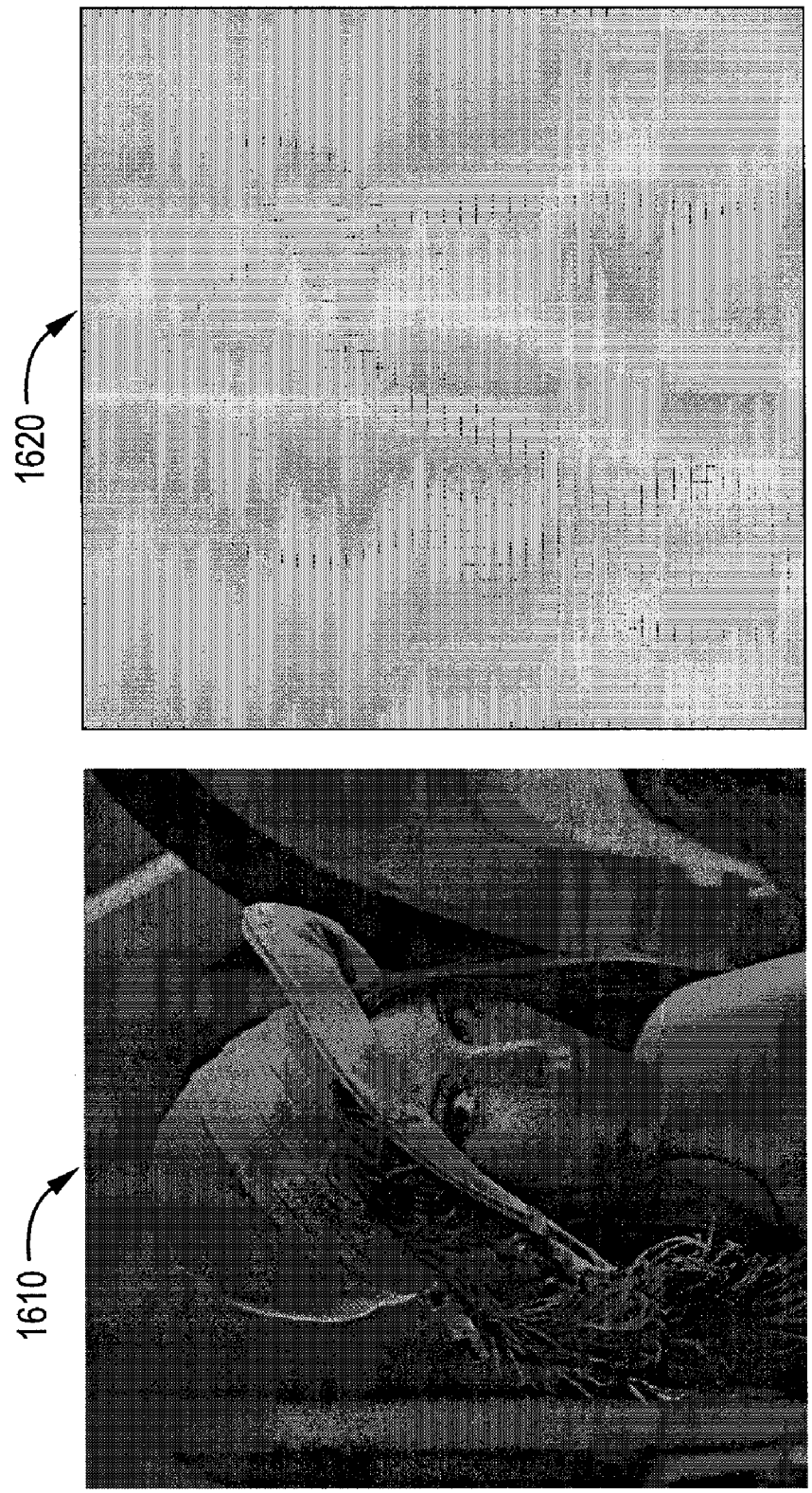
FIG. 16 illustrates an image and a visualization of the corresponding curvelet-based edge map.

We note that our algorithm relies on the approximation properties of curvelets and our heuristics are that only a small fraction of the curvelet coefficients are significant and that these significant coefficients capture local features. Therefore, the model we have is that $g_j(x_1, x_2), j_1 \leq j \leq j_2$, are sparse maps, similar in nature to segmentation maps, where the highest values are attained in proximity to strong edges in the image. FIG. 16 illustrates an image 1610 and a visualization 1620 of the corresponding curvelet-based edge map. More particularly, FIG. 16 shows the Lena image 1610 and a visualization 1620 of the curvelet-based edge map $g_5(x_1, x_2)$ associated with the curvelet coefficients at the scale 5.

We compute the j-th-scale signature $v_j^q \in \mathbb{R}^7$ as Hu's invariants for the normalized curvelet response function $g_j(x_1, x_2)$. The signature of a given image is the union of all scale signatures $Sig_I := \{v_j^q\}_{j=j_1}^{j_2}$. In certain embodiments, 2-3 scales and 7 invariants per scale are used. This results in a total signature length of 14-21 floating point numbers, which may be stored in 56-84 bytes, substantially smaller than the size of a 512 by 512 pixel, 8-bit grayscale image, which is 262144 bytes.

Certain embodiments provide a simple approach to fast CBIR using relatively small "signatures." In certain embodiments, more advanced CBIR methodologies incorporating learning may be applied, using curvelets as the underlying low-level system. Local groups of curvelet coefficients may be grouped into multiscale "features" and processed in a similar manner to the AdaBoost method disclosed in K. Tieu and P. Viola, Boosting image retrieval, Comp. Vision 56 (2004), 17-36, for example. Signatures typically used in current systems incorporate various types of histograms of pixel values or responses of filters designed to detect edges and textures in an image. However, these methods capture only the "amount" or "nature" of edges or texture, but do not capture structure. Such signatures are not useful in many applications because images may have similar overall features and differ only in the geometry of the structure. For example, in medical imaging, images acquired from the same modality of the same body part may be very similar with respect to overall features, differing in the geometry of the structure.

One or more images stored in the database 230 have an associated signature that is used to determine a match. For example, an image may be loaded into the database 230 by the database image input component 204. A signature for the image is then determined. For example, the signature may be determined by the database image input component 204. The image and associated signature are then stored in the database 230. In certain embodiments, the database image input component 204 utilizes the signature processor 210 to determine a signature to be associated with the image. In certain embodiments, the matching processor 220 utilizes signature processor 210 to determine a signature for an image in the database 230. For example, while determining a match for a query image, the matching processor 220 may utilize the signature processor 210 to determine a signature for each image in the database 230 being considered for a match.

FIGS. 4A-4E illustrate exemplary images in the database 230 according to an embodiment of the present invention. In the case of the exemplary images shown in FIGS. 4A-4E, all of the images but one (FIG. 4D) are CR images of the neck. Since the imaging modality and body part are usually written into the DICOM image header, the database may be pre-filtered using a textual-based query. However, in some cases the laboratory technician may not input this data and the body part is missing from the body header, such as in the case of the image illustrated in FIG. 4D.

The matching processor 220 then matches the query signature with one or more images stored in the database 230. Matching the query signature may include identifying one or more images in the database 230 that are exact or similar matches basted at least in part on a correlation between the signatures. For example, the matching processor 220 may find an exact match or a closest match to the query image based at least in part on the query signature. As another example, the matching processor 220 may rank, order, and/or sort one or more images in the database 230 based at least in part on the query signature. The matching processor 220 may then provide the identified matches to a user or another application, for example.

Matching may be based at least in part on a query signature and a signature associated with an image in the database 230. The associated signature may be predetermined, for example. As another example, the associated signature may be determined during the matching operation.

For a given distance $\rho$ on $\mathbb{R}^7$ (assuming the first 7 Hu's invariants are used), we define the correlation between a query image $I_q$ and a database image $I_{db}$ as:

$$\text{auto}(S_{I_q}, S_{I_{db}}) := \min_{\substack{j_1 \leq j_q < j_2 \\ j_1 \leq j_{db} < j_2 \\ 0 \leq w \leq 1}} \{w\rho(v_{j_q}^q, v_{j_{db}}^{db}) + (1-w)\rho(v_{j_q+1}^q, v_{j_{db}+1}^{db})\}$$

FIGS. 5A-5B illustrate matching images as determined according to an embodiment of the present invention. More particularly, FIGS. 5A-B illustrate the top matches from the database 230, including the images illustrated in FIGS. 4A-E, to the query image illustrated in FIG. 3. Notice that the top match (FIG. 5A) is similar to the query image (FIG. 3) via reflection invariance, which can be supported by using the first six Hu invariants.

In certain embodiments, the matching of the matching processor 220 is invariant under shift, rotation, and scale.

In certain embodiments, the curvelet coefficients composing the sparse representation can be quantized to $\{-1, 1\}$ while the non-significant coefficients are set to zero. Then, the signature is simply the stored parameters of the significant coefficients (scale, orientation, location) and an extra sign bit. All of this information may be compressed to around 2-3 bytes, depending on the scale of the coefficients.

In certain embodiments, the signature preserves the multi-resolution structure of the curvelet representation and at the time of retrieval the search is carried out from low to high scale. Candidate images that have similar low-resolution features such as a similar histogram (e.g., quickly computed from the low-resolution coefficients) are passed to the comparison of higher level curvelet coefficients. This may allow shift and rotation invariance to be supported by the algorithm. There are very few coefficients at lower scales and we can compare them up to certain discrete rotations and shifts. Once candidates pass the "similarity" test at a certain scale, curvelet coefficients are used at higher scales for a finer "score" of similarity to the input image. Thus, the multi-resolution structure allows for a speed up in the search, where initially only the first few elements of the signature vector are compared and the last elements are only used for evaluating/grading the top matches.

In certain embodiments, the system 200 can work within a prescribed accuracy. That is, longer signatures imply a more accurate approximation of the corresponding image and thus allow a more accurate retrieval process where, potentially, the top matches are given their higher "score" based on relatively higher resolution visual content. For example, given a hand radiograph with specific fracture at a specific location, one can use the system 200 with prescribed longer signatures to retrieve top matches with fractures at the same location.

In certain embodiments, one or more of the images in the database 230 may include and/or be associated with metadata. For example, an image in the database 230 may include a DICOM header. The metadata may describe characteristics of the image. For example, an image may include a DICOM header with field-tags indicating a "modality" of "CR" and/or a "body part" of "neck." In certain embodiments, the images in the database 230 to be considered by the matching processor 220 may be filtered based at least in part on the included/associated metadata. For example, if a query image is of a neck of a patient, the matching processor 220 may consider images in the database 230 including the same characteristic for purposes of determining a match, score, and/or rank. In certain embodiments, the images in the database 230 are pre-filtered before matching based at least in part on the metadata. In certain embodiments, the images in the database 230 are filtered as part of the matching process based at least in part on the metadata. In certain embodiments, images in the database 230 are textually filtered based at least in part on the metadata.

In certain embodiments, histograms generated from low-resolution images $I_{low}$, produced by the curvelet transform Equation 3, may be used for fast, "rough" pre-filtering.

FIG. 6 illustrates a system 600 for texture analysis and retrieval according to an embodiment of the present invention. The system 600 includes a signature processor 610, a matching processor 620, and a texture database 630.

The matching processor 620 is in communication with the signature processor 610 and the texture database 630. The texture database 630 is in communication with the signature processor 610.

In operation, the matching processor 620 receives a query texture patch. The matching processor 620 determines a query signature for the query texture patch using the signature processor 610. The matching processor 620 then determines one or more matches for the query texture patch in the texture database 630 based at least in part on the query signature.

Figure 7:
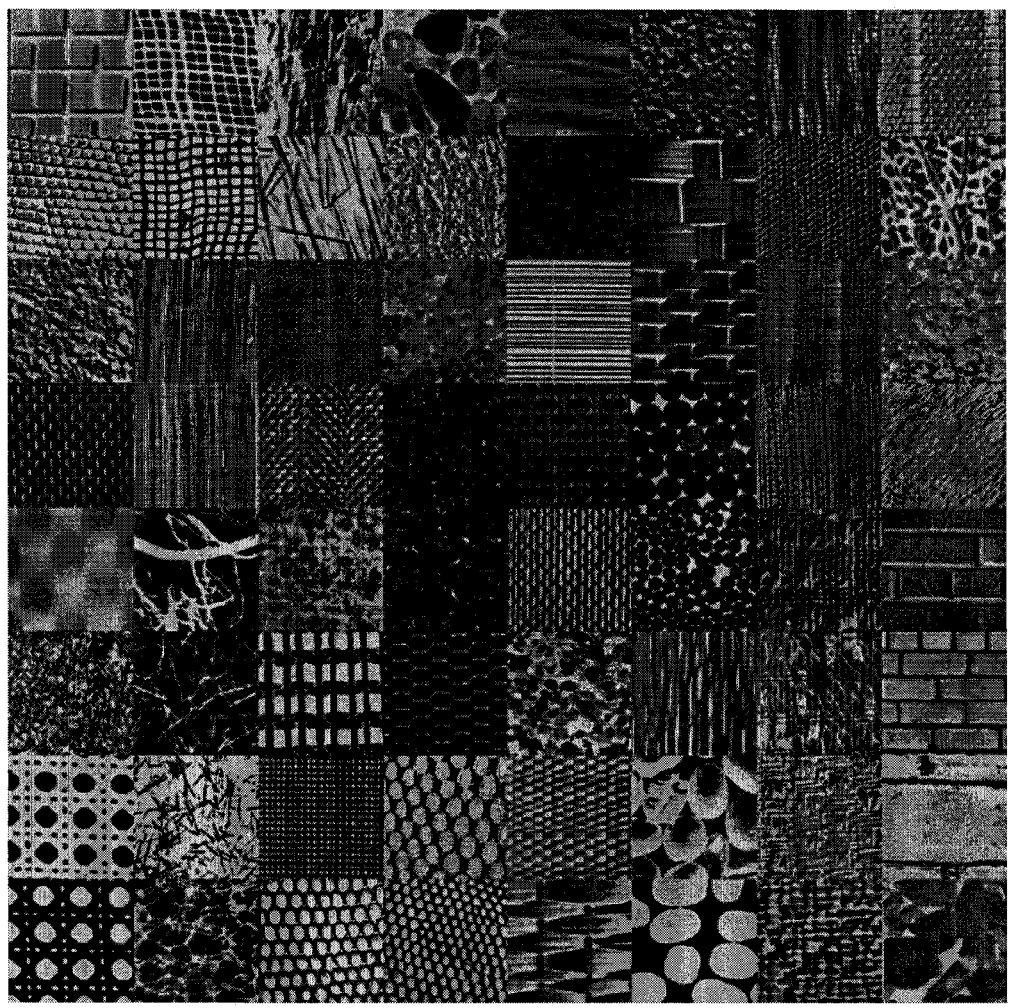
FIG. 7 illustrates exemplary textures in the database.

FIG. 7 illustrates exemplary textures in the database 630. More particularly, FIG. 7 illustrates samples from the Brodatz database, see P. Brodatz, Textures: A Photographic Album for Artists and Designers, Dover Publications, New York, 1966.

The signature processor 610 is adapted to determine a signature for a texture using matrices $M_j(l_1,l_2)$, $1 \leq j_1 \leq j \leq j_2$, for some fixed minimal and maximal scales $j_1, j_2$. Each such matrix represents local correlation between the two directions indexed by $l_1$ and $l_2$ at the given scale j. Thus, textural information is captured by a relatively small multiscale texture "signature" composed of a collection of small matrices. In the discrete implementation of the curvelet transform, each scale j contains curvelets in the (Cartesian analogue of) angles:

$$\theta_l = 2\pi 2^{-\lfloor j/2 \rfloor} l, \quad l = 0, 1, \ldots, 0 \leq \theta_l < \pi$$

Let $v_{j,l,k} := \theta_{j,l} k_1, k_2$ be the "center" of the curvelet function $\phi_{j,l,k}$ and let $\rho$ be some distance on $\mathbb{R}^2$ (e.g., the $l_p$ distance for $1 \leq p < \infty$, where $l_2$ is the Euclidian distance). We quantify the local "interaction" between two directions, at the scale j, using the following formula:

$$M_j(l_1, l_2) := \frac{\tilde{M}_j(l_1, l_2) - \min \tilde{M}_j}{\max \tilde{M}_j - \min \tilde{M}_j}, \quad \text{(Equation 5)}$$

$$\tilde{M}_j(l_1, l_2) := \sum_{k_1} p_{j,l_1,k_1} \sum_{k_2} d_{j,l_1,k_1}(l_2, k_2) p_{j,l_2,k_2},$$

$$p_{j,l,k} := \frac{|c_{j,l,k}|}{\sum_{k'} |c_{j,l,k'}|},$$

$$d_{j,l_1,k_1}(l_2, k_2) := \frac{\overbrace{(\rho(v_{j,l_1,k_1}, v_{j,l_2,k_2}) + 1)^{-1}}^{\text{how 'far' is } \varphi_{j,l_2,k_2} \text{ from } \varphi_{j,l_1,k_1}}}{\underbrace{\sum_k (\rho(v_{j,l_1,k_1}, v_{j,l_2,k}) + 1)^{-1}}_{\text{normalization term}}}$$

Observe that $M_j(l_1,l_2)$ is simply a normalization of $\tilde{M}_j(l_1,l_2)$. Each entry of $\tilde{M}_j(l_1,l_2)$ receives major contributions in cases where there are two significant curvelet coefficients at the scale j and directions $l_1$ and $l_2$ with "close" centers. In cases where one of the coefficients is not significant or the two coefficients correspond to curvelets whose centers are relatively far, the contribution is small.

Figure 8A:
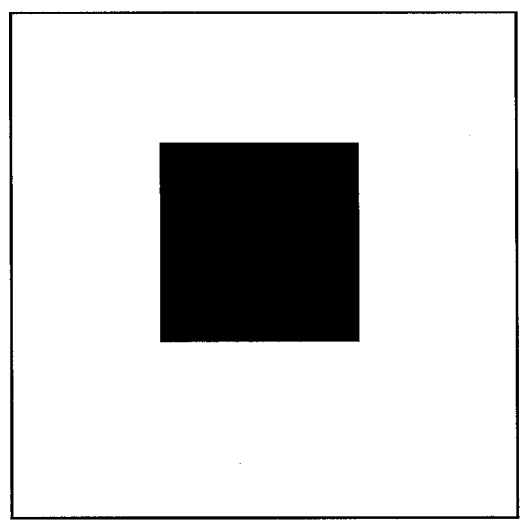
FIG. 8A illustrates an image of a black square.
Figure 8B:
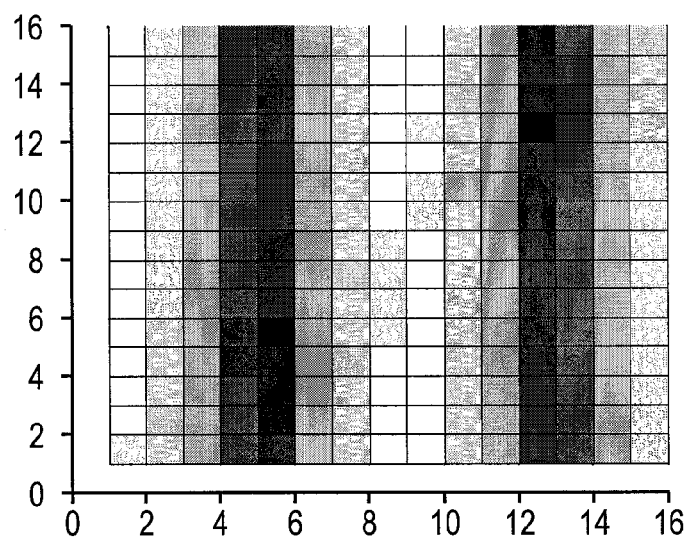
FIGS. 8B-C illustrate entries of matrices according to an embodiment of the present invention.
Figure 8C:
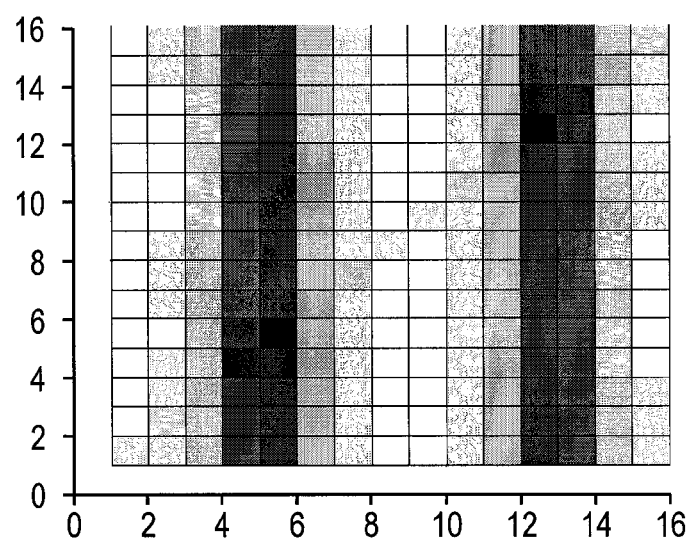

This principal is demonstrated with the following example. FIG. 8A illustrates an image of a black square. FIGS. 8B-C illustrate entries of matrices according to an embodiment of the present invention. More particularly, FIG. 8B illustrates entries of the matrix $M_2(l_1,l_2)$ and FIG. 8C illustrates entries of the matrix $M_3(l_1,l_2)$.

At both scales, we see two significant entries on the diagonal at the directional indices corresponding to the horizontal and vertical directions which are indeed the orientations of the edges of the square. However, we see some local interaction between these two main directions and all other directions. This comes from the curvelet coefficients whose essential support is concentrated in the vicinity of the black square's corners. Notice that due to normalization, $M_2(l_1,l_2)$ and $M_3(l_1,l_2)$ are very similar, but $M_3(l_1,l_2)$ the matrix corresponding to the higher scale, better captures the information. That is, it has "higher peaks" at the two main orientations and less interaction between orientations at corners.

FIGS. 9A-C illustrate examples of texture test images and their corresponding directional interaction matrices. The reader should interpret the matrix $M_3(l_1,l_2)$ for the "straw" image (FIG. 9A) as: the texture has strong directionality in a specific orientation, but with strong local interactions with all other directions. Notice how our simple local analysis reveals the oriented structure in the "sand" image (FIG. 9C) which corresponds to the shape of the grains.

FIGS. 10A-B illustrate examples of textures and their corresponding directional matrices. In particular, FIGS. 10A-B demonstrate that our local directional analysis reveals the very different structure for textures that visually seem very similar.

FIGS. 11A-D illustrate matrices for rotated versions of a sample texture image. In particular, FIGS. 11A-D show the matrices $M_3(l_1, l_2)$ for rotated versions of the "straw" image (FIG. 9A) by 0, 30, 60 and 90 degrees, respectively. Notice that for each rotation, the directional correlation matrix is approximately a shifted version of the original "straw" image in the direction of its second diagonal (top-left to bottomright). That is, the matrices for rotations of the "straw" image are roughly periodic along the second diagonal.

The matching processor 620 may determine one or more matching textures in the texture database 630 for the query texture in a variety of ways. Let $f_1$ and $f_2$ be two texture images of the same size. In one embodiment, the distance between two textures may be determined by employing their corresponding directional texture matrices $\{M_j^1\}$ and $\{M_j^2\}$ is to calculate:

$$\min_{\substack{0 \leq \theta < \pi \\ j_{min} \leq j_1, j_2 < j_{max}}} \left( \tilde{\rho}(M_{j_1}^1, M_{j_2}^2(\theta)) + \tilde{\rho}(M_{j_1+1}^1, M_{j_2+2}^2(\theta)) \right) \quad \text{(Equation 6)}$$

Invariance is achieved by the minimization of Equation 6 as follows. The individual matrices $\{M_j\}$ are already shift invariant. Rotation invariance is achieved by minimizing over the angle $\theta$, while scale invariance is supported by minimizing over scale correspondences $j_1 \leftrightarrow j_2$. For scale invariance it is important that the matrices $\{M_j\}$ are normalized. As can be seen from the examples discussed above, for "rough" analysis, even one low resolution is enough, so long that the coefficients at this scale are processed correctly (i.e., in similar manner to Equation 5).

In certain embodiments, the matching of the matching processor 620 is invariant under shift, rotation, and scale.

Figure 12:
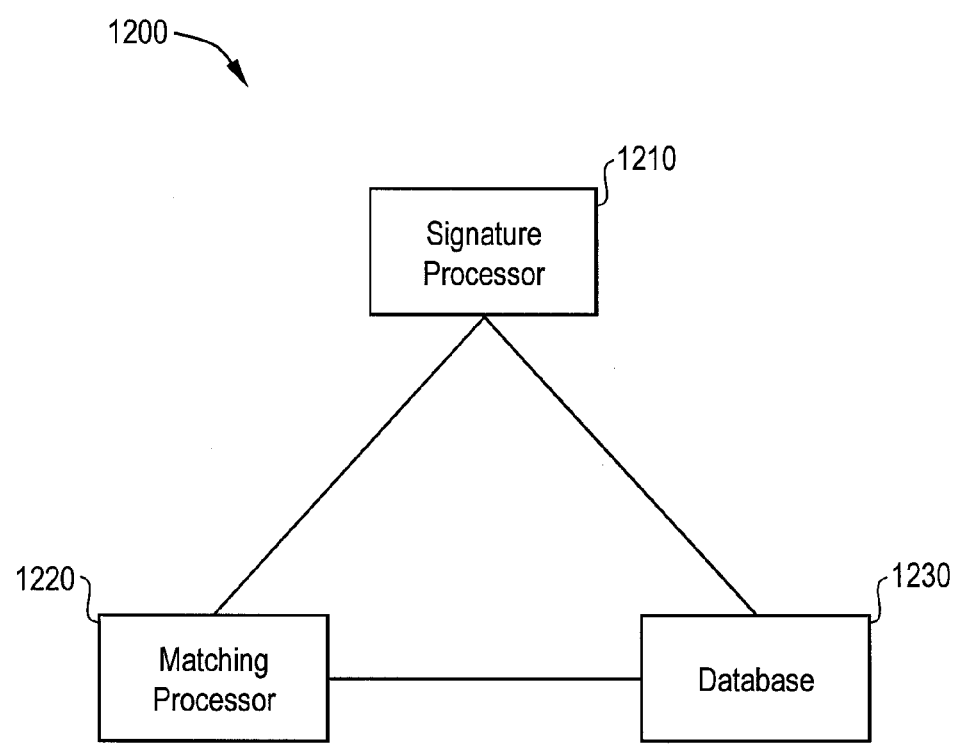
FIG. 12 illustrates a system for object recognition according to an embodiment of the present invention.

FIG. 12 illustrates a system 1200 for object recognition according to an embodiment of the present invention. The system 1200 includes a signature processor 1210, a matching processor 1220, and a database 1230.

The matching processor 1220 is in communication with the signature processor 1220 and the database 1230. The database 1230 is in communication with the signature processor 1210.

Figure 13:
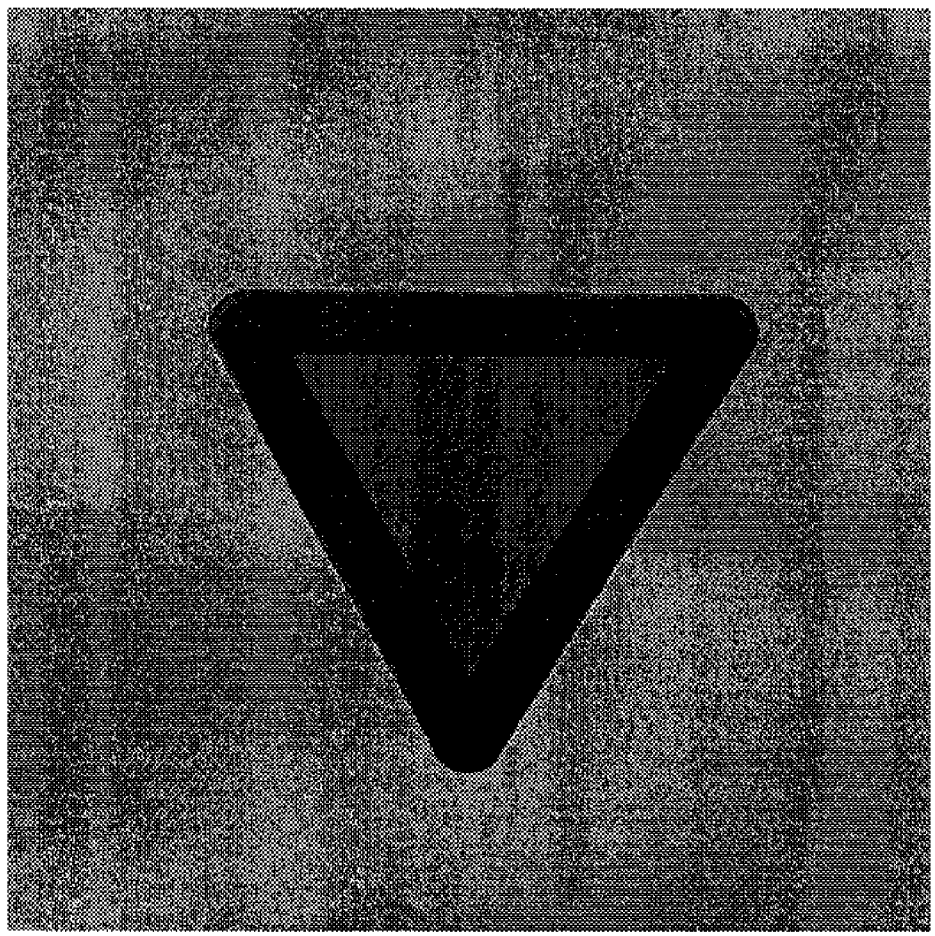
FIG. 13 illustrates an exemplary image of an object used in accordance with an embodiment of the present invention.

In operation, the matching processor 1220 receives an image of an object. FIG. 13 illustrates an exemplary image of an object used in accordance with an embodiment of the present invention. More particularly, FIG. 13 illustrates a road sign. The object image may be received from the database 1230, for example. As another example, the object image may be received from a user.

The matching processor 1220 is adapted to determine where the received object appears in one or more input images. The input images may be stored in the database 1230, for example. As another example, the input images may be received from an external source, such as a camera or streaming video feed. For example, the input images may be received in "real-time" from an imaging system or webcam.

The matching processor 1220 determines a signature for an object image and for an input image, and then based on those signatures, determines whether the object appears in the input image. If the matching processor 1220 determines that the object appears in the input image, then the matching processor 1220 may generate an output indicating that the object appears in the input image, for example. As another example, the matching processor 1220 may generate an output identifying where in the input image the object was detected. If the matching processor 1220 determines that the object does not appear in the input image, then the matching processor 1220 may generate an output indicating that the object was not found, for example.

In certain embodiments, the matching processor 1220 utilizes local feature matching to determine where the received object appears in an input image. Local feature matching is based on the theory that the object recognized contains one or more key features and that if the object exists in an input image, then there is a single affine transform that maps the object to features in the input image.

In certain embodiments, the matching processor 1220 is adapted to utilize the signature processor 1220 to perform local feature matching. The signature processor 1220 is adapted determine a local feature for an image. The local feature may include a local group of significant curvelet coefficients at a given scale. This approach allows great flexibility where the characteristics of local features may depend on the type of objects that we need to recognize and on performance requirements.

In certain embodiments, it is assumed that the received object has sharp edge features and that a relatively "reasonable" portion of the features are not occluded in the input images.

In certain embodiments, matching processor 1220 is invariant under one or more of shift, rotation, changes in size or scale, and/or partial occlusion of the received object in the input image. That is, if the received object appears in the input image (possibly rotated, smaller or bigger, and/or partially occluded by other objects in the input image), then the matching processor 1220 returns a positive answer with an identification of the location(s) of the input object.

In certain embodiments, the signature processor 1220 is adapted to identify local features with groups of curvelet coefficients satisfying the following conditions:

(a) The number of curvelets in the group is bounded from below and above using thresholds. The thresholds may be pre-determined, for example. The idea is that a local feature will describe a reasonably significant curved edge piece. However, for the purpose of supporting occlusions, the pieces should not be too long. In certain embodiments, the curvelet group size may be bounded to 5.

(b) The coefficients' moduli are above some threshold. The threshold may be pre-determined, for example. The threshold may be in the range of 0.3-0.5, for example.

(c) The curvelets' centers are sufficiently close (relative to their scale). For example, a distance of 20 pixels may be used at the second-highest scale (recall the highest scale may be discarded).

(d) The curvelets' orientation is similar (relatively their scale). This may be done by determining neighborhoods of wedges, for example.

Each local group may be fitted with a quadratic polynomial curve piece using least squares. Recall that an affine transform A on $\mathbb{R}^2$ is determined by a 2×2 matrix M and shift vector $v \in \mathbb{R}^2$, such that $Ax = Mx + v$, for each point $x \in \mathbb{R}^2$. Let $\{of_i\}$ be the set of object local features and let $\{tf_j\}$ be the set of local features of the input image. In general, the number of local features in the input image can be significantly larger than the number of object features, since the object feature is only a subset of the total features in the input image. For each pair of three object features and three input image features $(of_i, tf_j)$, we compute the unique affine transform $A_{i,j}$ that maps the three centers of the object features to the centers of the test image features. We allocate a grade/weight to the match by the correspondence in directionality between the features.

The set of all computed affine transforms $A_{i,j}$ determines a bounded domain in the space of affine transforms. We quantize this bounded domain using a cover with overlapping centers. Each "sample" affine transform in our quantization receives a score based on the sum of weights of the affine transforms in its neighborhood.

Figure 14:
FIG. 14 illustrates an input image with a received object matched according to an embodiment of the present invention.

Once the affine transform with the highest score is found, we check to see if the score is bigger than some threshold. The threshold corresponds to the minimal number of features we want to match and the tolerance for the approximation of the match. If the score is bigger than the threshold, then we declare the object is found and we can display the estimated location by marking the matched local features in the test image. FIG. 14 illustrates an input image with a received object matched according to an embodiment of the present invention. More particularly, the image in FIG. 14 shows the road sign image of FIG. 13 correctly identified. Note that although the shapes of the sign object (FIG. 13) and the sign in the input image (FIG. 14) are similar, there is a significant contrast difference between the two.

The components, elements, and/or functionality of systems 200, 600, and 1200 may be implemented alone or in combination in various forms in hardware, firmware, and/or as a set of instructions in software, for example. Certain embodiments may be provided as a set of instructions residing on a computer-readable medium, such as a memory or hard disk, for execution on a general purpose computer or other processing device.

Figure 15:
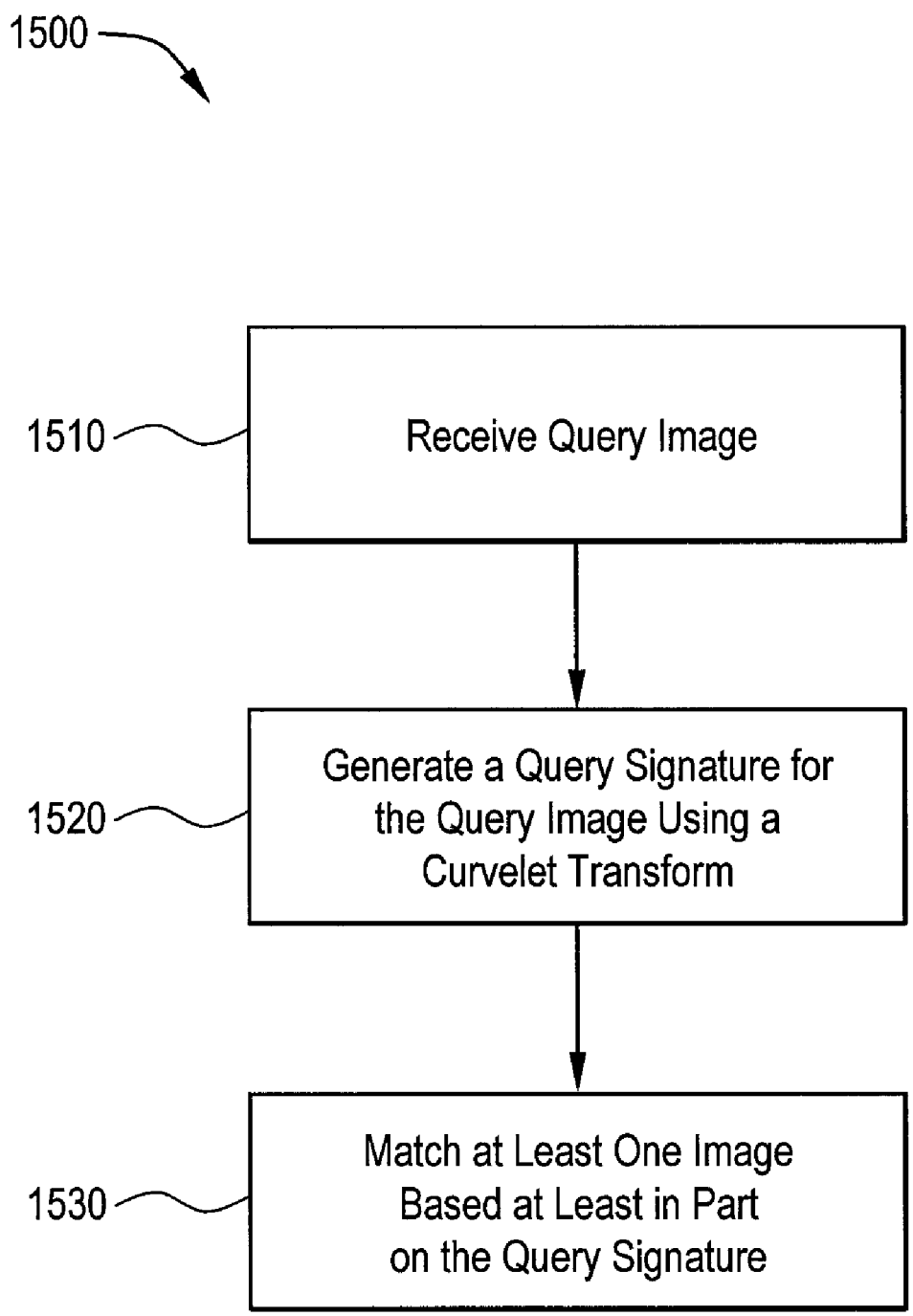
FIG. 15 illustrates a flow diagram for a method for computer vision using curvelets according to an embodiment of the present invention.

FIG. 15 illustrates a flow diagram for a method 1500 for computer vision using curvelets according to an embodiment of the present invention. The method 1500 includes the following steps, which will be described below in more detail. At step 1510, a query image is received. At step 1520, a query signature is generated for the query image using a curvelet transform. At step 1530, a match is made with at least one image based at least in part on the query signature. The method 1500 is described with reference to elements of systems described above, but it should be understood that other implementations are possible.

At step 1510, a query image is received. The query image may be an image such as a medical image, for example. As another example, the query image may be a texture. As another example, the query image may be an image of an object.

The query image may be received by a matching processor, similar to the matching processor 220, the matching processor 620, and/or the matching processor 1220, described above, for example. The query image may be received from a query image input component similar to the query image input component 202, described above, for example.

At step 1520, a query signature is generated for the query image using a curvelet transform. The query image may be the query image received at step 1510, described above, for example.

The query signature may be generated by a signature processor similar to the signature processor 210, the signature processor 610, and/or the signature processor 1210, described above, for example.

The query signature may be generated for a matching processor, similar to those described above, utilizing the signature processor, for example.

At step 1530, a match is made with at least one image based at least in part on the query signature. The query signature may be the query signature generated at step 1520, described above, for example.

The match may be made by a matching processor, similar to the matching processor 220, the matching processor 620, and/or the matching processor 1220, described above, for example.

The at least one image maybe stored in a database similar to the database 230, the texture database 630, and/or the database 1230, described above, for example.

One or more of the images may be associated with a signature. The signature may be generated using a signature processor similar to the signature processor 210, the signature processor 610, and/or the signature processor 1210, described above, for example.

The match may be made based at least in part on a correspondence between the query signature and a signature associated with an image.

The match may include identifying identical and/or similar images, for example. For example, the match may include scoring or ranking images based at least in part on the query signature. Alternatively, the match may include identifying an object within an image.

In certain embodiments, the at least one image may be pre-filtered. For example, the at least one image may be pre-filtered based at least in part on metadata associated with the images.

One or more of the steps of the method 1500 may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device.

Certain embodiments of the present invention may omit one or more of these steps and/or perform the steps in a different order than the order listed. For example, some steps may not be performed in certain embodiments of the present invention. As a further example, certain steps may be performed in a different temporal order, including simultaneously, than listed above.

Certain embodiments of the present invention provide systems and methods for computer vision using curvelets. Certain embodiments provide systems and methods for CBIR using curvelets. Certain embodiments provide systems and methods for texture analysis and retrieval using curvelets. Certain embodiments provide systems and methods for object recognition using curvelets. Certain embodiments of the present invention provide a technical effect of computer vision using curvelets. Certain embodiments provide a technical effect of CBIR using curvelets. Certain embodiments provide a technical effect of texture analysis and retrieval using curvelets. Certain embodiments provide a technical effect of object recognition using curvelets.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A system for computer vision, the system including:
   a plurality of images;
   a signature processor of at least one processing device adapted to generate a signature based at least in part on a curvelet transform, the signature including a portion of a plurality of curvelet coefficients of the curvelet transform that is significant, wherein the signature is a vector of real numbers with a length less than a number of corresponding image pixels; and
   a matching processor of the at least one processing device adapted to receive a query image, wherein the matching processor is adapted to determine a query signature for the query image using the signature processor, and wherein the matching processor is adapted to determine at least one matching image from the plurality of images based at least in part on the query signature.

2. The system of claim 1, wherein each image in the plurality of images is associated with an image signature.

3. The system of claim 2, wherein the matching processor is adapted to determine the at least one matching image further based on the associated image signatures.

4. The system of claim 2, wherein at least one of the image signatures is generated using the signature processor.

5. The system of claim 2, wherein the determined at least one matching image is determined based on a correspondence between the query signature and the image signatures.

6. The system of claim 1, wherein the query image includes a series of images and the curvelet transform is a three-dimensional curvelet transform.

7. The system of claim 1, wherein the query image is a query texture.

8. The system of claim 1, wherein the query image is an object to be identified.

9. The system of claim 1, wherein the plurality of images form a texture database.

10. The system of claim 1, wherein the determined at least one matching image is determined by a score for at least one of the plurality of images.

11. The system of claim 1, wherein the determined at least on matching image is determined by ranking at least one of the plurality of images.

12. The system of claim 1, wherein the curvelet transform includes a discrete curvelet transform.

13. The system of claim 1, wherein the curvelet transform is a partial curvelet transform.

14. The system of claim 1, wherein the curvelet transform is invariant under shift, rotation, and scale.

15. A method for computer vision, the method including:
receiving a query image;
generating a query signature for the query image based at least in part on a curvelet transform, the query signature including a portion of a plurality of curvelet coefficients of the curvelet transform that is significant, wherein the query signature is a vector of real numbers with a length less than a number of corresponding image pixels; and
matching at least one image from a plurality of images based at least in part on the query signature.

16. The method of claim 15, wherein each image in the plurality of images is associated with an image signature.

17. The method of claim 16, wherein the at least one image is matched further based on the associated image signatures.

18. The method of claim 17, wherein the at least one image is matched based on a correspondence between the query signature and the associated image signatures.

19. The method of claim 15, wherein the query image is a query texture.

20. The method of claim 15, wherein the query image is an object to be identified.

21. The method of claim 15, wherein the query image is received at a matching processor.

22. The method of claim 15, wherein the query signature is generated by a signature processor.

23. The method of claim 15, wherein the curvelet transform is invariant under shift, rotation, and scale.

24. A system for content based image retrieval, the system including:
a signature processor of at least one processing device adapted to generate a signature based at least in part on a curvelet transform, the signature including a portion of a plurality of curvelet coefficients of the curvelet transform that is significant, wherein the signature is a vector of real numbers with a length less than a number of corresponding image pixels;
a database including a plurality of database images, wherein each database image is associated with a database image signature generated by the signature processor; and
a matching processor of the at least one processing device adapted to determine a query signature for a query image using the signature processor, and wherein the matching processor is adapted to determine at least one matching image from the plurality of database images based at least in part on the query signature and the associated database image signatures.

25. The system of claim 24, further including a query image input component adapted to receive the query image.

26. The system of claim 24, further including a database image input component adapted to receive a database image to be included into the database.

27. The system of claim 26, wherein database image component is adapted to use the signature processor to determine the database image signature associated with the received database image.

28. The system of claim 24, wherein the matching processor is adapted to filter the plurality of database images based on metadata associated with each of the database images.

29. The system of claim 24, wherein the curvelet transform is:

$$\{I(x_1, x_2)\} \underset{FDCT}{\Longrightarrow} I_{low} + \{c_{j,l,k} = \langle I, \varphi_{j,l,k}\rangle\}_{j\geq 1}$$

where FDCT is a Fast Discrete Curvelet Transform (FDCT), I represents an input digital image, $I_{low}$ represents a low resolution image, c represents a curvelet coefficient, $\phi$ represents a curvelet function, j represents a scale, l represents an orientation, and k represents a location.

30. The system of claim 24, wherein the matching processor determines the at least one matching image based on a correspondence between the query signature and the associated database image signatures.

31. The system of claim 30, wherein the correspondence is determined using the equation:

$$\text{auto}(S_{I_q}, S_{I_{db}}) := \min_{\substack{j_1 \leq j_q < j_2 \\ j_1 \leq j_{db} < j_2 \\ 0 \leq w \leq 1}} \{w\rho(v_{j_q}^q, v_{j_{db}}^{db}) + (1-w)\rho(v_{j_q+1}^q, v_{j_{db}+1}^{db})\}$$

where S represents the signature, $I_q$ represents a query image, $I_{db}$ represents a database image, w represents a floating point number between zero (0) and one (1), $\rho$ represents a distance, v represents a center of curvelet function $\phi_{j,l,k}$, and j represents a scale.

32. A system for texture analysis and retrieval, the system including:
a signature processor of at least one processing device adapted to generate a signature based at least in part on a curvelet transform, the signature including a portion of a plurality of curvelet coefficients of the curvelet transform that is significant, wherein the signature is a vector of real numbers with a length less than a number of corresponding image pixels;
a texture database including a plurality of database textures, wherein each database texture is associated with a database texture signature generated by the signature processor; and
a matching processor of the at least one processing device adapted to determine a query signature for a query texture using the signature processor, and wherein the matching processor is adapted to determine at least one matching texture from the plurality of database texture based at least in part on the query signature and the associated database texture signatures.

33. The system of claim 32, wherein the curvelet transform is:

$$M_j(l_1, l_2) := \frac{\tilde{M}_j(l_1, l_2) - \min \tilde{M}_j}{\max \tilde{M}_j - \min \tilde{M}_j},$$

$$\tilde{M}_j(l_1, l_2) := \sum_{k_1} p_{j,l_1,k_1} \sum_{k_2} d_{j,l_1,k_1}(l_2, k_2) p_{j,l_2,k_2},$$

$$p_{j,l,k} := \frac{|c_{j,l,k}|}{\sum_{k'} |c_{j,l,k'}|},$$

$$d_{j,l_1,k_1}(l_2, k_2) := \frac{\overbrace{(\rho(v_{j,l_1,k_1}, v_{j,l_2,k_2}) + 1)^{-1}}^{\text{how 'far' is } \varphi_{j,l_2,k_2} \text{ from } \varphi_{j,l_1,k_1}}}{\underbrace{\sum_k (\rho(v_{j,l_1,k_1}, v_{j,l_2,k_2}) + 1)^{-1}}_{\text{normalization term}}}$$

where M are matrices, c represents a curvelet coefficient, $\rho$ represents a distance, v represents a center of curvelet function $\phi_{j,l,k}$ $\rho$ represents a weighted absolute value of a curvelet coefficient, d represents a weighted distance between the center of a first curvelet function and the center of a second curvelet function, j represents a scale, l represents an orientation, and k represents a location.

34. The system of claim 32, wherein the matching processor determines the at least one matching texture based on a correspondence between the query signature and the associated database texture signatures.

35. The system of claim 34, wherein the correspondence is determined using the equation:

$$\min_{\substack{0 \leq \theta < \pi \\ j_{min} \leq j_1, j_2 \leq j_{max}}} \left( \tilde{\rho}(M^1_{j_1}, M^2_{j_2}(\theta)) + \tilde{\rho}(M^1_{j_1+1}, M^2_{j_2+2}(\theta)) \right)$$

where M are matrices, $\rho$ represents a distance, $\theta$ represents an angle, and j represents a scale.

* * * * *